United States Patent
Haberkorn et al.

(10) Patent No.: US 11,150,964 B1
(45) Date of Patent: Oct. 19, 2021

(54) SEQUENTIAL PROCESSING OF CHANGES IN A DISTRIBUTED SYSTEM

(71) Applicant: SAP SE, Walldorf (DE)

(72) Inventors: Michael Haberkorn, Bad Schoenborn (DE); Alexander Becker, Mühlhausen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/931,740

(22) Filed: May 14, 2020

(51) Int. Cl.
G06F 9/54 (2006.01)
G06F 11/14 (2006.01)
G06F 16/182 (2019.01)
G06F 16/22 (2019.01)
G06F 16/17 (2019.01)

(52) U.S. Cl.
CPC ............. *G06F 9/542* (2013.01); *G06F 9/544* (2013.01); *G06F 9/546* (2013.01); *G06F 11/1464* (2013.01); *G06F 11/1469* (2013.01); *G06F 16/1734* (2019.01); *G06F 16/182* (2019.01); *G06F 16/2282* (2019.01)

(58) Field of Classification Search
CPC .... G06F 9/542; G06F 16/182; G06F 16/2282; G06F 16/1734; G06F 9/544; G06F 9/546; G06F 11/1464; G06F 11/1469
See application file for complete search history.

(56) References Cited

U.S. PATENT DOCUMENTS

| | | | |
|---|---|---|---|
| 10,031,690 B1* | 7/2018 | Panidis | G06F 3/0608 |
| 11,089,105 B1* | 8/2021 | Karumbunathan | H04L 67/1097 |
| 2004/0083244 A1* | 4/2004 | Muecklich | G06F 16/275 |
| 2006/0053305 A1* | 3/2006 | Wahlert | G06F 11/1464 713/189 |
| 2019/0303470 A1* | 10/2019 | Lee | G06F 16/2282 |
| 2020/0145962 A1* | 5/2020 | Alasti | H04W 72/044 |

* cited by examiner

*Primary Examiner* — Doon Y Chow
*Assistant Examiner* — Kimberly L Jordan
(74) *Attorney, Agent, or Firm* — Buckley, Maschoff & Talwalkar LLC (57) ABSTRACT

Systems and methods include reception of a request for changed data of an object from a subscriber, determination of a logging table associated with the object, determination of a pointer to a last-processed entry of the logging table based on the object and the subscriber, determination of one or more entries of the logging table subsequent to the last-processed entry, determination of a last entry of the determined one or more entries, buffering of a pointer to the last entry, transferring of data reconstructed based on the one or more entries to the subscriber, and, in response to a determination that the transfer of data was successful, updating of the pointer to the last-processed entry of the logging table with the buffered pointer.

19 Claims, 6 Drawing Sheets

| Order ID | Item ID | Sequence ID | Timestamp | Operation | User |
|---|---|---|---|---|---|
|  |  |  |  |  |  |
|  |  |  |  |  |  |
|  |  |  |  |  |  |

| Client | Timestamp | Subscriber ID | Object Name | Object Type | Status |
|---|---|---|---|---|---|
|  |  |  |  |  |  |
|  |  |  |  |  |  |
|  |  |  |  |  |  |

| Client | Subscriber ID | Object Name | Object Type | Subscriber Logging Table | Last Processed Pointer |
|---|---|---|---|---|---|
|  |  |  |  |  |  |
|  |  |  |  |  |  |
|  |  |  |  |  |  |

| Client | Subscriber ID | Object Name | Object Type | Subscriber Logging Table | Last Replicated Pointer |
|---|---|---|---|---|---|
|  |  |  |  |  |  |
|  |  |  |  |  |  |
|  |  |  |  |  |  |

SEQUENTIAL PROCESSING OF CHANGES IN A DISTRIBUTED SYSTEM

BACKGROUND

Conventional database systems store large volumes of data related to many aspects of an enterprise. It is often desirable to mirror respective portions of the data stored in one system (i.e., a source system) within one or more other systems (i.e., target systems). For example, it may be desirable to mirror a portion of data stored in a source system which is particularly suited for data acquisition and storage within a target system which is particularly suited for data analysis.

A replication server may be used to create and update target tables in a target system which mirror respective source tables in a source system. The replication server may utilize a change data capture mechanism executing on the source system. The change data capture mechanism includes database triggers executing on the source system which identify and log changes which occur to specified source tables. The replication server accesses the logging tables and applies the changes to corresponding target tables.

Conventionally, the replication server has full control over the recording of changes and the processing of the changed data. In order to allow applications miming on the same application server as the source system to utilize the change data capture mechanism without using the replication server, some architectures move control over the recording of changes and the processing of the changed data to the source system. The changed data is transferred locally from the change data capture mechanism to the subscribing applications. Since the data remains in the memory of the mechanism work process after the transfer, successful processing can be committed or failures can be handled within the same server session.

In the case of a distributed subscriber, such as a replication server, the changed data is returned to a remote function call issued by the distributed subscriber. The work process of the remote function call to the source system closes and the memory is cleared after return of the data. Successful processing of the data or any failures therefore cannot be handled within the same server session. Systems are desired to commit or rollback transfers of changed data returned to a remote function call issued by a distributed subscriber.

DETAILED DESCRIPTION

The following description is provided to enable any person in the art to make and use the described embodiments. Various modifications, however, will remain readily-apparent to those in the art.

Generally, for subscribers of a subscription-based change data capture mechanism working in a distributed system setup, some embodiments include a buffer in a source system which identifies the data that was passed during a remote function call. Some embodiments further include Application Programming Interfaces (APIs) which allow the subscriber to load the required data from the buffer to commit successful processing of data, or to roll back the data in case of processing error.

Figure 1:
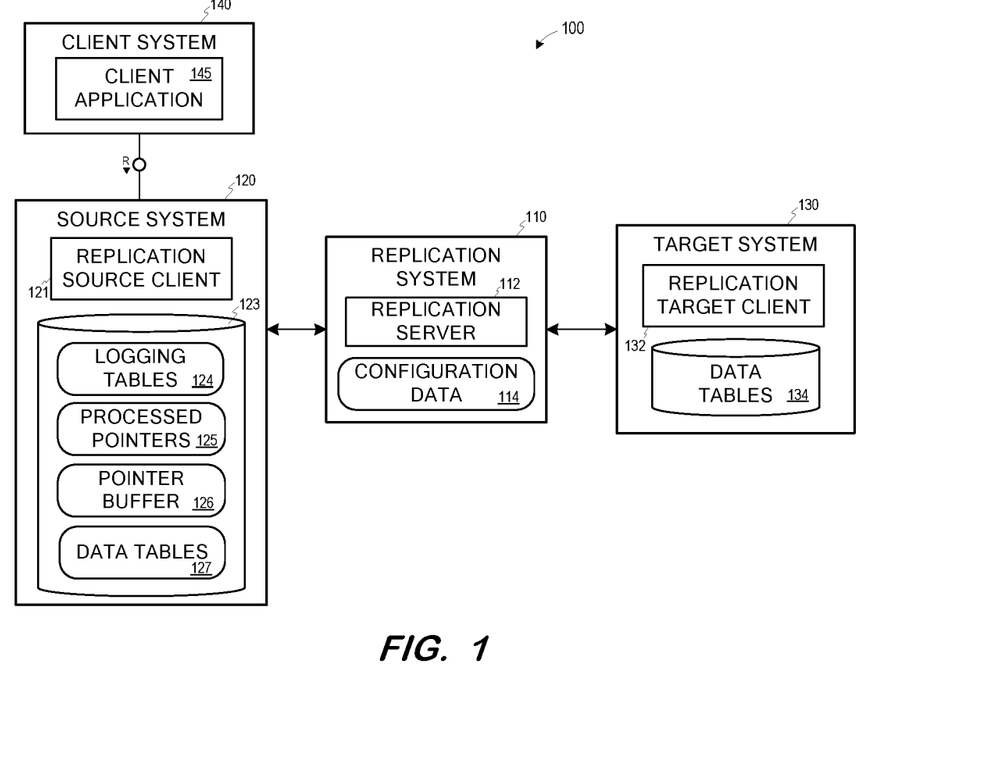
FIG. 1 is a replication architecture according to some embodiments.

FIG. 1 illustrates system 100 according to some embodiments. System 100 includes replication system 110 for replicating data from source system 120 into target system 130. Although FIG. 1 illustrates one source system and one target system, in some embodiments replication system 110 may replicate data from any number of source systems to any number of target systems.

Generally, replication system 110 may execute replication server 112 based on configuration data 114 to maintain a replica of one or more objects (e.g., tables, views) of source system 120 in target system 130. Configuration data 114 may specify particular objects of a particular source system to be replicated in one or more particular target systems. Maintaining such replicas includes replicating records of specified ones of data tables 127 to data tables 134.

Client device system 140 may execute client application 145 to communicate with source system 120. Client application 145 may comprise code executing within a Web browser executed by client system 140 according to some embodiments. Client application 145 may comprise a business application which accesses data of data tables 127. Such access may include inserting new records, updating existing records or deleting existing records of data tables 127. Client application 145 may also or alternatively provide data archiving functionality to move selected records of data tables 127 to an archive data storage (not shown).

Source system 120 may execute replication source client 121 to record changes to configuration-specified ones of tables 127 in logging tables 124. Replication server 112 may check for such changes and provide any changes to appropriate ones of tables 134 via replication target client 132.

According to some embodiments, replication source client 121 includes database triggers to detect insert, update and delete operations which are performed on records of specified ones of data tables 127 during database transactions. In some embodiments, an individual database trigger is created for each operation on each specified table. The database triggers record the detected operations as log entries in corresponding ones of logging tables 124.

As will be described in detail below, logging tables 124 may include, for each database record affected by a database transaction, a log entry specifying the key field values of the database record and the type of operation performed on the record. Replication source client 121 may further include an observer process which reads the log entries and writes similar log entries into subscriber logging tables, each of which is associated with particular data table. Based on a request received from a subscriber (e.g., replication server 112) for changed data of a given object, a data reconstruction and transfer process of replication source client 121 reconstructs the changed data based on the log entries and transfers the changed data to the subscriber.

In particular, processed pointers 125 indicate, for a given subscriber and object, one or more subscriber logging tables and, for each of the one or more subscriber logging tables, a last subscriber logging table entry processed by the subscriber. Based on processed pointers 125, the data reconstruction and transfer process determines a pointer to a last-processed entry of each subscriber logging table associated with the requested object, reads all entries of the subscriber logging tables which are subsequent to their last-processed entries, reconstructs data of the object based on the read entries, and transfers the data to the subscriber. In a case that the object is a data table, the object is associated with only one subscriber logging table. If the object is a view which selects data from more than one underlying data table, the object is associated with one subscriber logging table per underlying data table.

Pointer buffer 126 stores pointers to the last read entries of each subscriber logging table used to generate the transferred data. If transfer of the data to target system 130 is successful, replication server 112 calls an API of source system 120 to commit the successful processing. For example, the processed pointers 125 of each subscriber logging table used to generate the transferred data are overwritten with the pointers of pointer buffer 126 which are associated with each subscriber logging table.

If transfer of the data to target system 130 is not successful, replication server 112 calls an API of replication source client 121 to roll back the data transfer. Rollback may include removing, from pointer buffer 126, the pointers to the last read entries of each subscriber logging table used to generate the transferred data.

The data stored within tables 127 and tables 134 may comprise one or more of conventional tabular data, row-based data, column-based data, and object-based data. According to some embodiments, replication server 112 operates to perform any transformations necessary to convert data from a format of tables 127 to a format of tables 134. The data may be distributed among several relational databases, dimensional databases, and/or other data sources.

Each of source system 120 and target system 130 may comprise any computing system capable of executing a database management system, of storing and independently managing data of one or more tenants and, in some embodiments, of supporting the execution of database server applications. Each of source system 120 and target system 130 may include a distributed storage system and/or distributed server nodes for performing computing operations as is known in the art. According to some embodiments, source system 120 is an on-premise transactional database system and target system 130 is an in-memory database system configured to provide data analytics, but embodiments are not limited thereto. In this regard, a client application (not shown) may communicate with one or more server applications (not shown) executing on target system 130 to perform data analytics on data stored in tables 134.

Source system 120 and target system 130 may implement an in-memory database, in which a full database is stored in volatile (e.g., non-disk-based) memory (e.g., Random Access Memory). The full database may be persisted in and/or backed up to fixed disks (not shown). Embodiments are not limited to in-memory implementations. For example, source system 120 and target system 130 may store data in Random Access Memory (e.g., cache memory for storing recently-used data) and one or more fixed disks (e.g., persistent memory for storing their respective portions of the full database).

Figure 2:
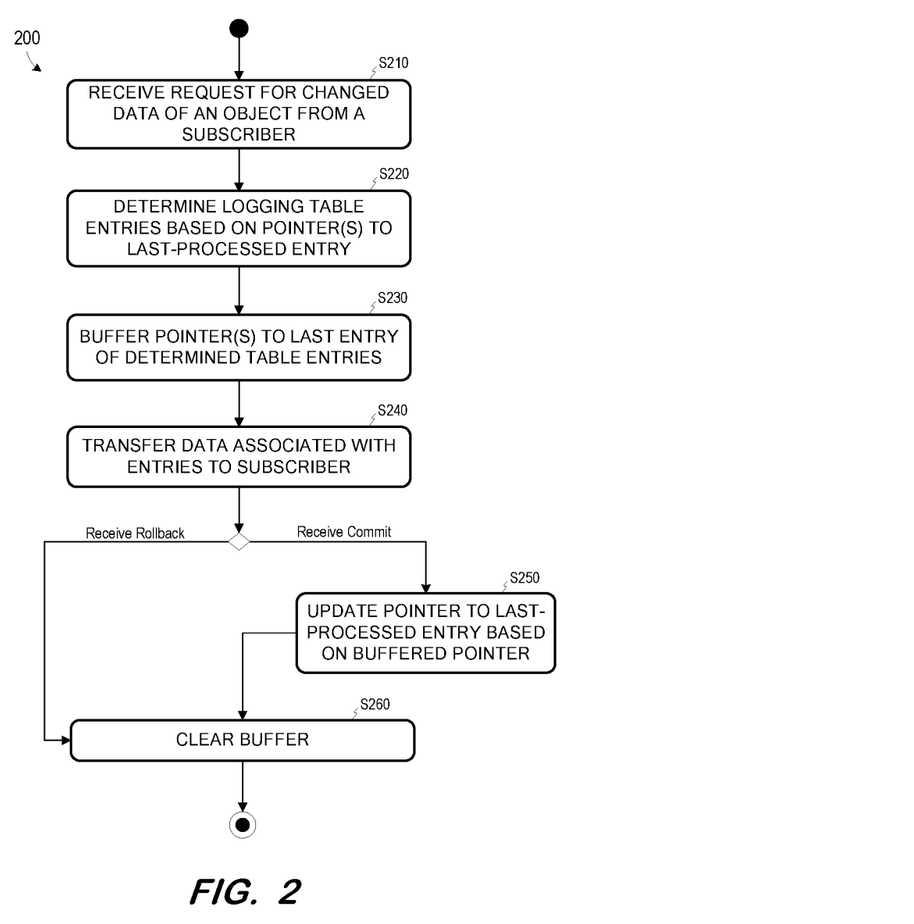
FIG. 2 is a flow diagram of a process to replicate changes to a distributed subscriber according to some embodiments.

FIG. 2 illustrates process 200 to process data changes in a distributed system according to some embodiments. Process 200 will be described with respect to the example of FIG. 1 but embodiments are not limited thereto.

Process 200 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

According to some embodiments, a request is received from a subscriber for changed data of an object at S210. The subscriber may be notified of the existence of the changed data prior to S210 according to some embodiments. This notification, as described below, may consist of a response to a query issued by the subscriber.

Next, at S220, logging table entries associated with the subscriber and the object are determined based on one or more pointers to last-processed logging table entries. In one example of S220, subscriber logging tables associated with the object are determined. The object is associated with only one subscriber logging table if the object is a data table, and with more than one subscriber logging table if the object is a view which selects data from more than one underlying data table. A last-processed pointer is determined for each of the determined subscriber logging tables based on the subscriber, the object, and a data structure indicating, for various combinations of subscribers, objects, and logging tables, pointers to last-processed logging table entries. Next, the pointers are used to determine all entries of the subscriber logging tables which are subsequent to the last-processed logging table entries.

A pointer to the last determined table entry of each one of the one or more logging tables is determined and buffered at S230. At S240, the determined logging table entries are used to generate data records corresponding to the changed data as is known in the art and the data records are transferred to the subscriber.

If the subscriber successfully transfers the data to a target system, a call to a commit API may then be received from the subscriber. If so, the last-processed pointers associated with each subscriber logging table used to generate the transferred data are overwritten at S250 with the corresponding pointers buffered at S230. The buffer is then cleared at S260.

If transfer of the data to target system is not successful, a call to a rollback API may be received. In this case, the buffer may be cleared at S260 without updating the last-processed pointers at S250. According, if a request is subsequently received from the subscriber for changed data of the same object, the request will be fulfilled using the previously-determined logging table entries and any entries of these logging table which were created after reception of the prior request.

Figure 3:
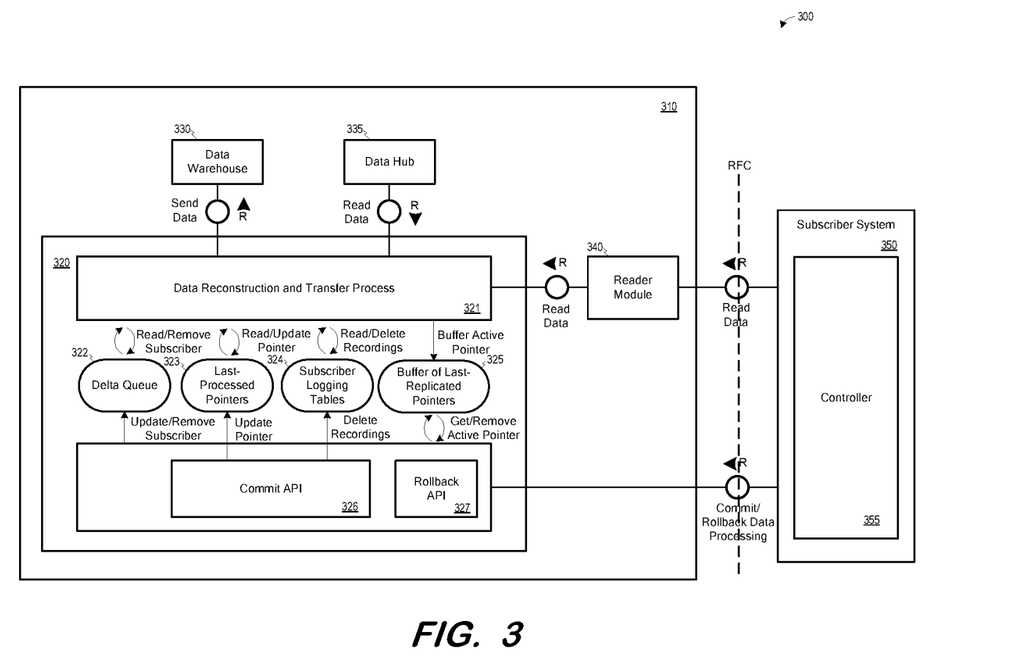
FIG. 3 is a block diagram of a distributed subscriber system and a source system including a change data capture engine in according to some embodiments.

FIG. 3 illustrates system 300 according to some embodiments. System 300 may comprise an implementation of system 100 but embodiments are not limited thereto.

System 300 includes source system 310 and subscriber system 350. Source system 310 includes change data capture engine 320, which in turn includes data reconstruction and transfer process 321. Data reconstruction and transfer process 321 handles reconstruction and transfer of object data changes, in conjunction with other components of change data capture engine 320.

For example, change data capture engine 320 may create a plurality of database triggers (not shown) for each subscribed-to database table of source system 310 to capture any update or delete operations on records of the database tables. In some embodiments, a database trigger creates a log entry associated with each detected operation and saves the log entry in a master logging table (not shown) associated with the corresponding database table. An observer process (not shown) monitors the entries of the master logging tables and copies entries corresponding to committed operations, in sequential order, into log entries of respective table-specific subscriber logging tables 324. Data reconstruction and transfer process 321 may reconstruct object data changes based on the entries of subscriber logging tables 324.

Figure 4:
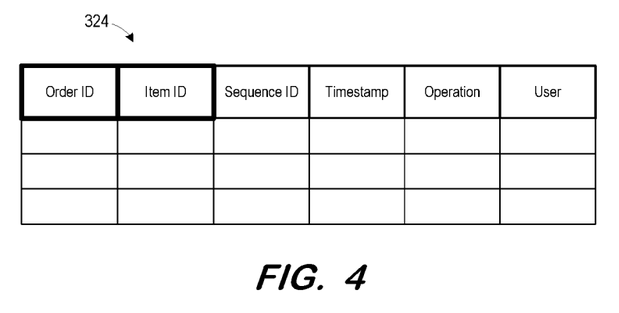
FIG. 4 is a tabular representation of a subscriber logging table according to some embodiments.

FIG. 4 illustrates subscriber logging table 324 for storing log entries associated with a particular data table of source system 310. As shown in FIG. 4, a log entry of example subscriber logging table 324 includes the key fields of a changed data record of the particular data table (e.g., Order ID and Item ID), a sequence ID, a timestamp, an operation identifier (e.g. insert, update or delete), and an identifier of the user.

As described above, the sequence ID is assigned by the observer process when the record (reflecting a committed operation) is inserted into subscriber logging table 324. The sequence IDs are assigned in an increasing sequence. Accordingly, the sequence IDs of each record of subscriber logging table 324 indicate an order in which each associated operation was committed to the database.

Delta queue 322 may indicate, for a given subscriber and object, that the object has been updated since the object data was last received by the subscriber. Delta queue 322 is therefore updated when a change to object data occurs, and is updated again once that change is provided to a subscriber.

Figure 5:
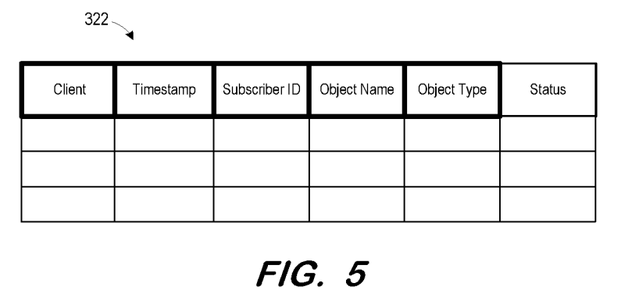
FIG. 5 is a tabular representation of a delta queue according to some embodiments.

FIG. 5 illustrates delta queue 322 according to some embodiments. The key field values of delta queue 322 specify a client (to account for a multi-tenant source system), a timestamp, a subscriber ID, and object name and an object type. Data reconstruction and transfer process 321 may determine (via the status field of delta queue 322) whether updates to a particular object are available for a particular subscriber by querying delta queue 322 with values of the corresponding key fields.

Figure 6:
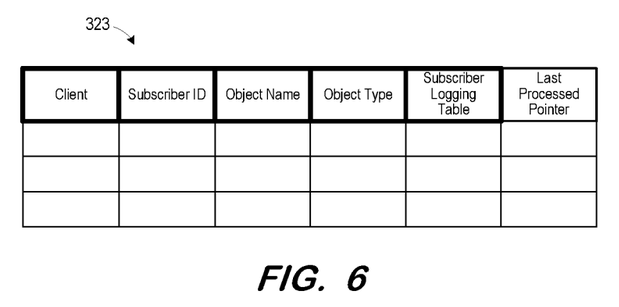
FIG. 6 is a tabular representation of a last-processed pointer table according to some embodiments.

Each record of last-processed pointers 323 of FIG. 6 specifies, for a given client, subscriber, object, and logging table (because an object may be associated with more than one underlying data table), a pointer to a last-successfully processed logging table entry. Last-processed pointers 323 may be used by a clean-up process to determine a lowest pointer (e.g., sequence ID) processed by all subscribers to a given logging table, and to delete all entries of the logging table having sequence IDs equal to or less than the lowest processed pointer.

Data reconstruction and transfer process 321 may also use last-processed pointers 323 to determine, for a given subscriber and object, the subscriber logging table entries which should be used to reconstruct data for providing to the subscriber. First, all the subscriber logging tables associated with an object are determined, and last-processed pointers 323 is used to determine a last-processed pointer for each of the determined subscriber logging tables based on the subscriber and the object. All entries of the associated subscriber logging tables which are subsequent to the last-processed entries are then determined and used to reconstruct data of the object.

Figure 7:
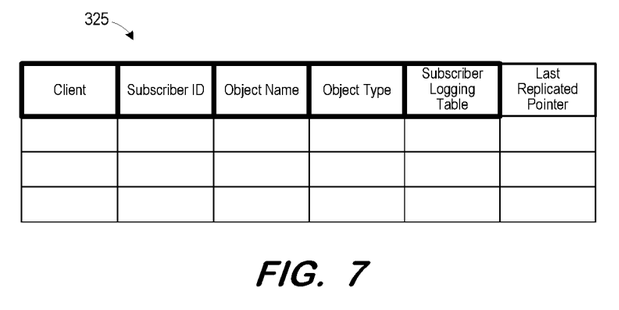
FIG. 7 is a tabular representation of a last-replicated pointer table according to some embodiments.

As shown in FIG. 7, buffer 325 of last-replicated pointers stores, for a given client, subscriber, object and subscriber logging table, a pointer to a last-replicated entry. Such an entry is the last (i.e., per sequence ID) entry in the subscriber logging table which was used to reconstruct associated data. Buffer 325 facilitates commits and rollbacks as described herein.

Commit API 326 may be called by a subscriber to indicate to engine 320 that data was successfully transferred. Similarly, rollback API 327 may be called to indicate problems with data transfer. Calls to either API may include the subscriber type, subscriber ID, object type and object name. This information is used to identify corresponding pointers of buffer 325, which are then used to commit or rollback the transfer as described herein.

As shown in FIG. 3, source system 310 also includes data warehouse 330 and data hub 335. As described above, transfer of data from engine 320 to data warehouse 330 and data hub 335 may be committed or rolled-back in a same server session.

Data reconstruction and transfer may proceed similarly for both local (330, 335) and distributed (350) subscribers. Upon receiving a request for changed data from a subscriber, data reconstruction and transfer process 321 determines changed objects of the subscriber based on delta queue 322. Data reconstruction and transfer process 321 calculates a range of logging table entries for each logging table underlying the object based on the last-processed pointers 324, reads the entries and provides corresponding reconstructed data to the subscriber.

For subscriber types (e.g., 330, 335) operating locally in source system 310, data reconstruction and transfer process 321 is responsible for commit or rollback handling. Process 321 therefore updates the delta queue, deletes a stored last-processed pointer per object and deletes the subscriber logging table entries.

For subscriber types (e.g., 350) operating in a distributed system setup, data reconstruction and transfer process 321 does not execute commit and rollback handling but simply buffers a pointer to the last entry selected from each subscriber logging table before returning the data to the distributed subscriber.

In case of a successful transfer, commit API 326 reads buffer 325 to obtain the last-replicated pointers to subscriber logging table entries which were used to calculate the transferred records, and updates last-replicated pointers 323 for these subscriber logging tables with the obtained last-replicated pointers. Commit API 326 removes the record from delta queue 322 which indicates to the subscriber that the object has changed. Commit API 326 may also determine, based on last-processed pointers 323, which entries of the subscriber logging tables have been processed by all subscribers, and delete the determined entries.

In contrast, rollback API 327 removes from buffer 325 the last-replicated pointers to subscriber logging table entries which were used to calculate the transferred records, and resets the record in delta queue 322 which indicated to the subscriber that the object has changed. As a result, the changed data will be subsequently regenerated and transferred (while also reflecting any intervening operations) in response to future requests for the data of the object.

Figure 8:
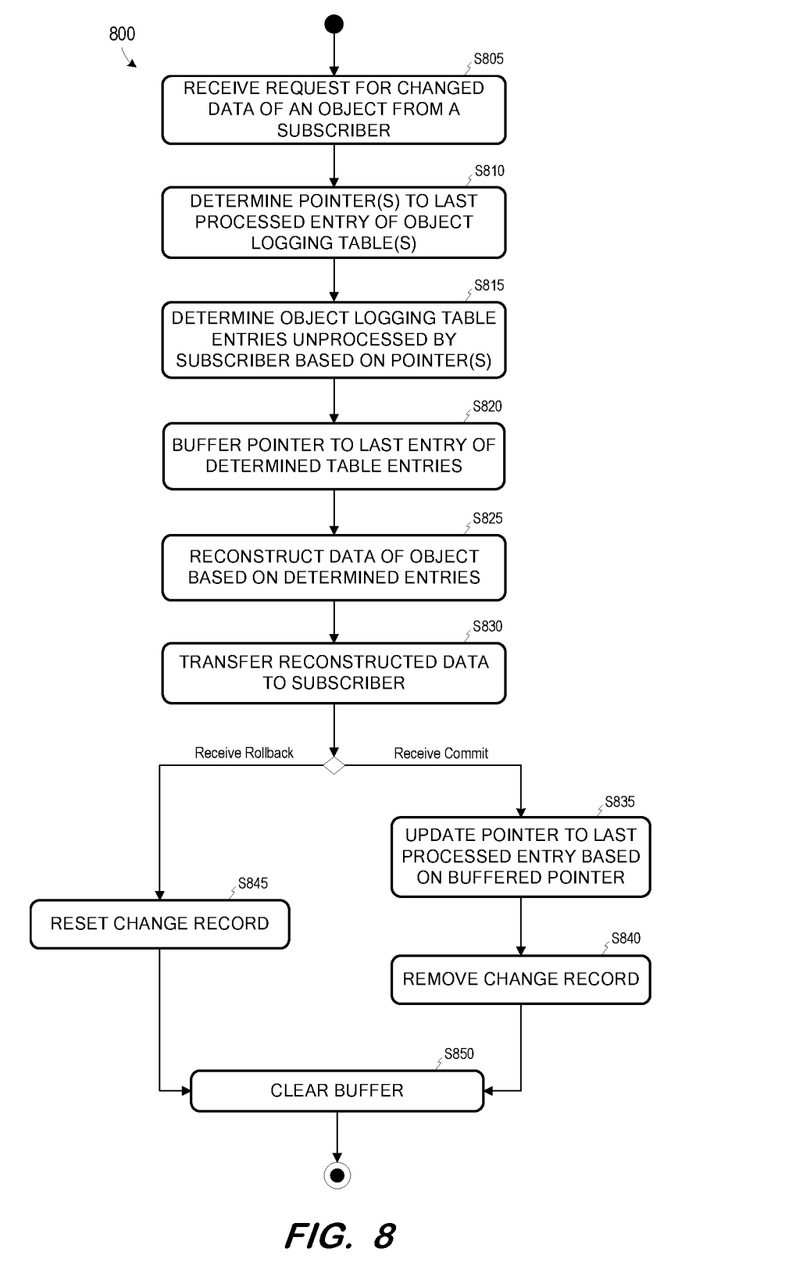
FIG. 8 is a flow diagram of a process to replicate changes to a distributed subscriber according to some embodiments.

FIG. 8 is a flow diagram of process 800 according to some embodiments. Process 800 will be described with respect to the components of FIG. 3 but embodiments are not limited thereto.

Initially, at S805, a request is received from a subscriber for changed data of an object. As mentioned above, delta queue 322 may be updated when a change to the data of an object occurs. The subscriber may detect the change by querying delta queue 322 with the object name and type in order to determine the changed status of the object.

Next, at S810, a pointer is determined for each subscriber logging table underlying the object. The determined pointer(s) points to a last entry of each logging table which was used to reconstruct changed data for the given subscriber and object (i.e., processed). The pointer(s) is used at S815 to determine all entries of the subscriber logging tables which are sequentially subsequent to the last-processed subscriber logging table entries.

For each subscriber logging table underlying the object, a pointer to the sequentially-last entry which was used to reconstruct the data is stored at S820 in buffer 325. At S825, the determined logging table entries are used to reconstruct data reflecting changes to the object as is known in the art. The reconstructed data is transferred to the subscriber at S830.

A call to commit API 326 may be received from the subscriber if the subscriber successfully transfers the data to a target system. In such a case, the last-processed pointers associated with each subscriber logging table which was used to generate the transferred data are updated at S835 with the pointers buffered at S820. Commit API 326 then removes, at S840, the record from delta queue 322 which indicates to the subscriber that the object has changed, and clears the buffered pointers at S850.

At S845, if transfer of the data to target system is not successful, rollback API 327 resets the record in delta queue 322 which indicated to the subscriber that the object has changed to again indicate that the object has changed. The buffered pointers are then also cleared at S850.

Figure 9:
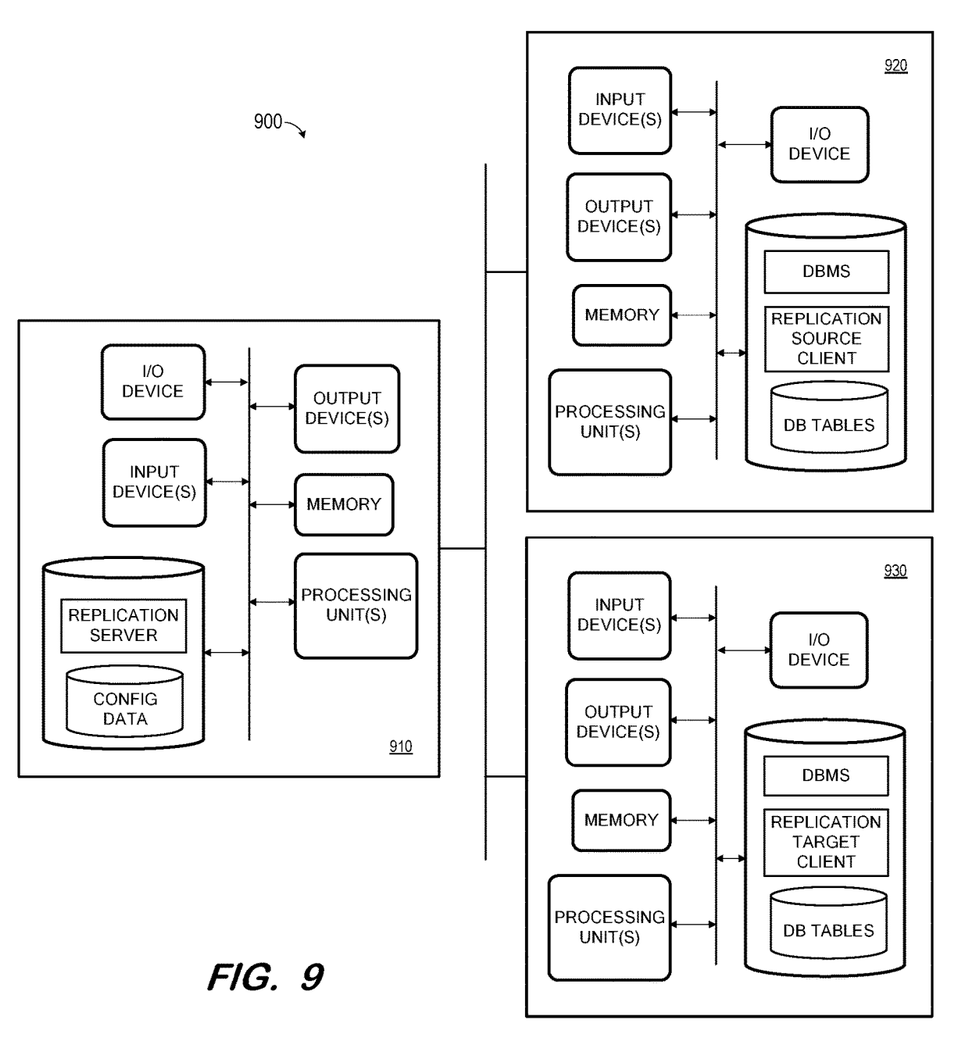
FIG. 9 is a block diagram of computing devices comprising a replication architecture for according to some embodiments.

FIG. 9 is a block diagram of system 900 according to some embodiments. System 900 includes replication system 910, which may comprise an implementation of replication system 110 or subscriber 350. Replication system 910 may be distributed from source system 920 and communicate with source system 920 via remote function calls as described herein. Source system 920 may comprise an implementation of source system 120 or 310 and target system 930 may comprise an implementation of target system 130. According to some embodiments, replication system 910 may communicate simultaneously with many source systems and target systems to perform replication of objects as described herein. Each of systems 910, 920 and 930 may comprise a general-purpose computing apparatus and may execute program code using processing unit(s) to perform any of the functions described herein. Each of systems 910, 920 and 930 may include other unshown elements according to some embodiments.

All data storage mentioned herein may be provided via combinations of magnetic storage devices (e.g., hard disk drives and flash memory), optical storage devices, Read Only Memory (ROM) devices, etc., while volatile memory may comprise Random Access Memory (RAM), Storage Class Memory (SCM) or any other fast-access memory.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable process steps;
a processing unit to execute the processor-executable process steps to cause the system to:
receive a request for changed data of an object from a subscriber;
determine a logging table associated with the object;
determine a pointer to a last-processed entry of the logging table based on the object and the subscriber;
determine one or more entries of the logging table subsequent to the last-processed entry;
determine a last entry of the determined one or more entries;
store a last-replicated entry pointer in a buffer, the last-replicated entry pointer pointing to the last entry;
reconstruct data of the object based on the determined one or more entries;
transfer the reconstructed data of the object to the subscriber; and
in response to a determination that the transfer of the reconstructed data of the object was successful, set the pointer to the last-processed entry of the logging table equal to the last-replicated entry pointer.

2. A system according to claim 1, wherein the determination that the transfer of data was successful comprises reception of a call to a commit API from the subscriber.

3. A system according to claim 1, the processor-executable process steps further to cause the system to:
determine that data of the object has changed;
in response to the determination that data of the object has changed, create a record of a delta queue associating the subscriber with the object and an indicator of the change; and
in response to the determination that the transfer of data was successful, remove the record from the delta queue.

4. A system according to claim 1, the processing unit to further execute the processor-executable process steps to cause the system to:

determine a second logging table associated with the object;
determine a second pointer to a last-processed entry of the second logging table based on the object and the subscriber;
determine a second one or more entries of the second logging table subsequent to the last-processed entry of the second logging table;
determine a last entry of the determined of the second one or more entries;
prior to transfer of the reconstructed data of the object, store a second last-replicated entry pointer in the buffer, the second last-replicated entry pointer pointing to the last entry of the determined second one or more entries; and
in response to the determination that the transfer of data was successful, set the second pointer to the last-processed entry of the second logging table equal to the second last-replicated entry pointer,
wherein the data of the object is reconstructed based on the determined one or more entries and the determined second one or more entries.

5. A system according to claim 4, the processor-executable process steps further to cause the system to:
determine that data of the object has changed;
in response to the determination that data of the object has changed, create a record of a delta queue associating the subscriber with the object and an indicator of the change; and
in response to the determination that the transfer of data was successful, remove the record from the delta queue.

6. A system according to claim 1, the processing unit to further execute the processor-executable process steps to cause the system to:
receive a second request for changed data of a second object from the subscriber;
determine a second logging table associated with the second object;
determine a second pointer to a last-processed entry of the second logging table based on the second object and the subscriber;
determine a second one or more entries of the second logging table subsequent to the last-processed entry of the second logging table;
determine a last entry of the determined of the second one or more entries;
store a second last-replicated entry pointer in the buffer, the second last-replicated entry pointer pointing to the last entry of the determined second one or more entries;
reconstruct data of the second object based on the determined second one or more entries;
transfer the reconstructed data of the second object to the subscriber; and
in response to a determination that the transfer of the reconstructed data of the second object was not successful, remove the second last-replicated entry pointer from the buffer.

7. A system according to claim 6, wherein the determination that the transfer of the reconstructed data of the object was successful comprises reception of a call to a commit API from the subscriber, and
wherein the determination that the transfer of the reconstructed data of the second object based on the second one or more entries was not successful comprises reception of a call to a rollback API from the subscriber.

8. A computer-implemented method comprising:
receiving a request for changed data of an object from a subscriber;
determining a logging table associated with the object;
determining a pointer to a last-processed entry of the logging table based on the object and the subscriber;
determining one or more entries of the logging table subsequent to the last-processed entry;
determining a last entry of the determined one or more entries;
storing a last-replicated entry pointer in a buffer, the last-replicated entry pointer pointing to the last entry;
reconstructing data of the object based on the determined one or more entries;
transferring the reconstructed data of the object based on the one or more entries to the subscriber; and
in response to determining that the transfer of the reconstructed data of the object was successful, setting the pointer to the last-processed entry of the logging table equal to the last-replicated entry pointer.

9. A method according to claim 8, wherein determining that the transfer of data was successful comprises reception of a call to a commit API from the subscriber.

10. A method according to claim 8, further comprising:
determining that data of the object has changed;
in response to determining that data of the object has changed, create a record of a delta queue associating the subscriber with the object and an indicator of the change; and
in response to the determination that the transfer of data was successful, remove the record from the delta queue.

11. A method according to claim 8, further comprising:
determining a second logging table associated with the object;
determining a second pointer to a last-processed entry of the second logging table based on the object and the subscriber;
determining a second one or more entries of the second logging table subsequent to the last-processed entry of the second logging table;
determining a last entry of the determined of the second one or more entries;
prior to transfer of the reconstructed data, storing a second last-replicated entry pointer in the buffer, the last-replicated entry pointer pointing to the last entry of the determined second one or more entries; and
in response to determining that the transfer of the reconstructed data was successful, setting the second pointer to the last-processed entry of the second logging table equal to the last-replicated entry pointer,
wherein the data of the object is reconstructed based on the determined one or more entries and the determined second one or more entries.

12. A method according to claim 11, further comprising:
determining that data of the object has changed;
in response to determining that data of the object has changed, creating a record of a delta queue associating the subscriber with the object and an indicator of the change; and
in response to determining that the transfer of data was successful, removing the record from the delta queue.

13. A method according to claim 8, further comprising:
receiving a second request for changed data of a second object from the subscriber;
determining a second logging table associated with the second object;

determining a second pointer to a last-processed entry of the second logging table based on the second object and the subscriber;

determining a second one or more entries of the second logging table subsequent to the last-processed entry of the second logging table;

determining a last entry of the determined of the second one or more entries;

storing a second last-replicated entry pointer in the buffer, last-replicated entry pointer pointing to the last entry of the determined second one or more entries;

reconstructing data of the second object based on the determined second one or more entries;

transferring the reconstructed data of the second object based on the second one or more entries to the subscriber; and in response to a determination that the transfer of the reconstructed data of the second object based on the second one or more entries was not successful, removing the second last-replicated entry pointer to the last entry of the determined second one or more entries from the buffer.

14. A method according to claim 13, wherein determining that the transfer of the reconstructed data of the object based on the one or more entries was successful comprises receiving a call to a commit API from the subscriber, and wherein determining that the transfer of the reconstructed data of the second object based on the second one or more entries was not successful comprises receiving a call to a rollback API from the subscriber.

15. A system comprising:

a target database system;

a subscriber system;

a source database system storing a database table, the source database system to:

receive a request for changed data of the database table from the subscriber system;

determine a logging table associated with the database table;

determine a pointer to a last-processed entry of the logging table based on the database table and the subscriber;

determine one or more entries of the logging table subsequent to the last-processed entry;

determine a last entry of the determined one or more entries;

store a last-replicated entry pointer in a buffer, the last-replicated entry pointer pointing to the last entry;

reconstruct data of the database table based on the determined one or more entries;

transfer the reconstructed data of the database table based on the one or more entries to the subscriber system for transfer to the target database system; and in response to a determination that the transfer of the reconstructed data of the database table to the target database system was successful, set the pointer to the last-processed entry of the logging table equal to the last-replicated entry pointer.

16. A system according to claim 15, wherein the determination that the transfer of data to the target database system was successful comprises reception of a call to a commit API from the subscriber system.

17. A system according to claim 15, the source database system to:

determine that data of the database table has changed;

in response to the determination that data of the database table has changed, create a record of a delta queue associating the subscriber system with the database table and an indicator of the change; and in response to the determination that the transfer of data was successful, remove the record from the delta queue.

18. A system according to claim 15, the source database system to:

receive a second request for changed data of a second database table from the subscriber system;

determine a second logging table associated with the second database table;

determine a second pointer to a last-processed entry of the second logging table based on the second database table and the subscriber;

determine a second one or more entries of the second logging table subsequent to the last-processed entry of the second logging table;

determine a last entry of the determined of the second one or more entries;

store a second last-replicated entry pointer in a buffer, the second last-replicated entry pointer pointing to the last entry of the determined second one or more entries;

reconstruct data of the second database table based on the determined second one or more entries;

transfer the reconstructed data of the second database table to the subscriber system; and in response to a determination that the transfer of reconstructed data of the second database table to the target database system was not successful, remove the second last-replicated entry pointer pointing pointer to the last entry of the determined second one or more entries from the buffer.

19. A system according to claim 18, wherein the determination that the transfer of the reconstructed data of the database table to the target database system was successful comprises reception of a call to a commit API from the subscriber system, and wherein the determination that the transfer of the reconstructed data of the second database table to the target database system was not successful comprises reception of a call to a rollback API from the subscriber system.

* * * * *